H. L. BURLESON & P. W. PRUTZMAN.
APPARATUS FOR THE DISTILLATION AND FRACTIONATION OF PETROLEUM AND OTHER LIQUIDS.
APPLICATION FILED APR. 11, 1913.
1,180,237.
Patented Apr. 18, 1916.
3 SHEETS—SHEET 1.
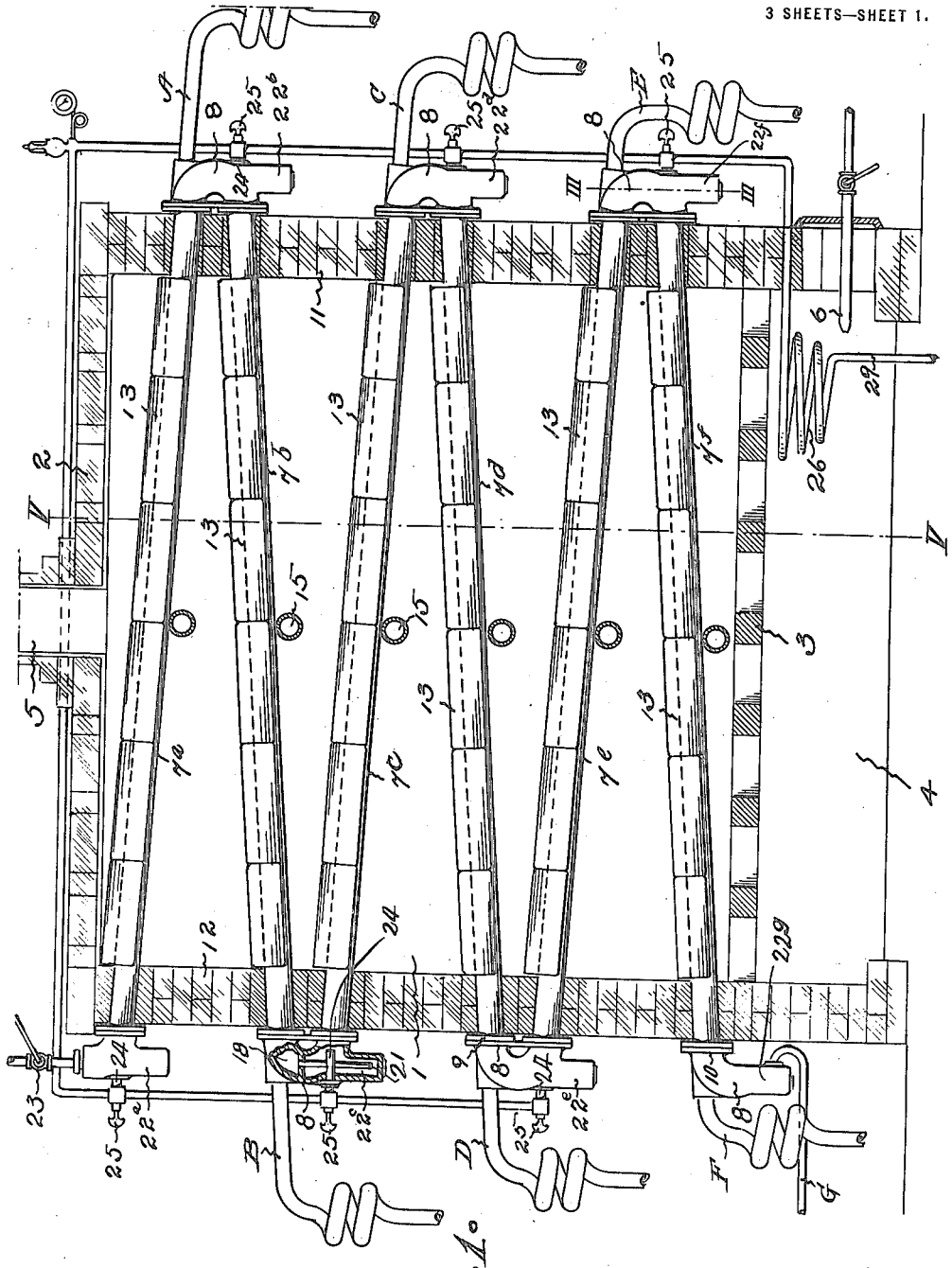

H. L. BURLESON & P. W. PRUTZMAN.
APPARATUS FOR THE DISTILLATION AND FRACTIONATION OF PETROLEUM AND OTHER LIQUIDS.
APPLICATION FILED APR. 11, 1913.
1,180,237.
Patented Apr. 18, 1916.
3 SHEETS—SHEET 2.
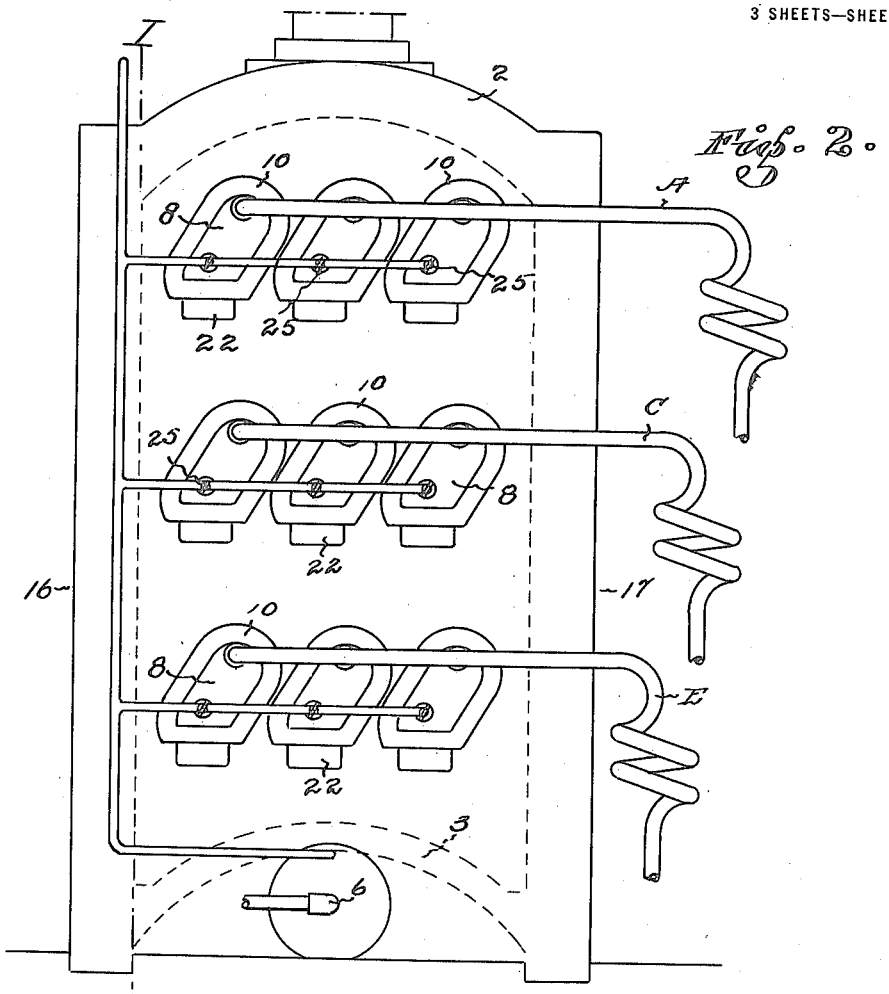
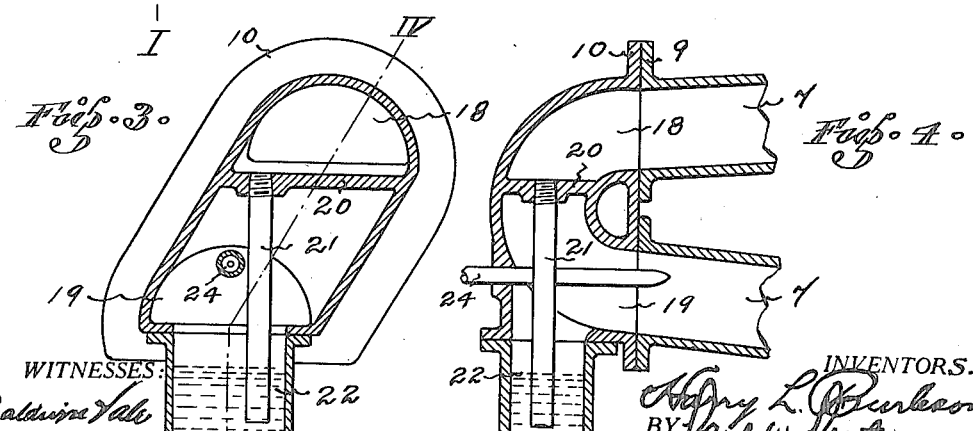

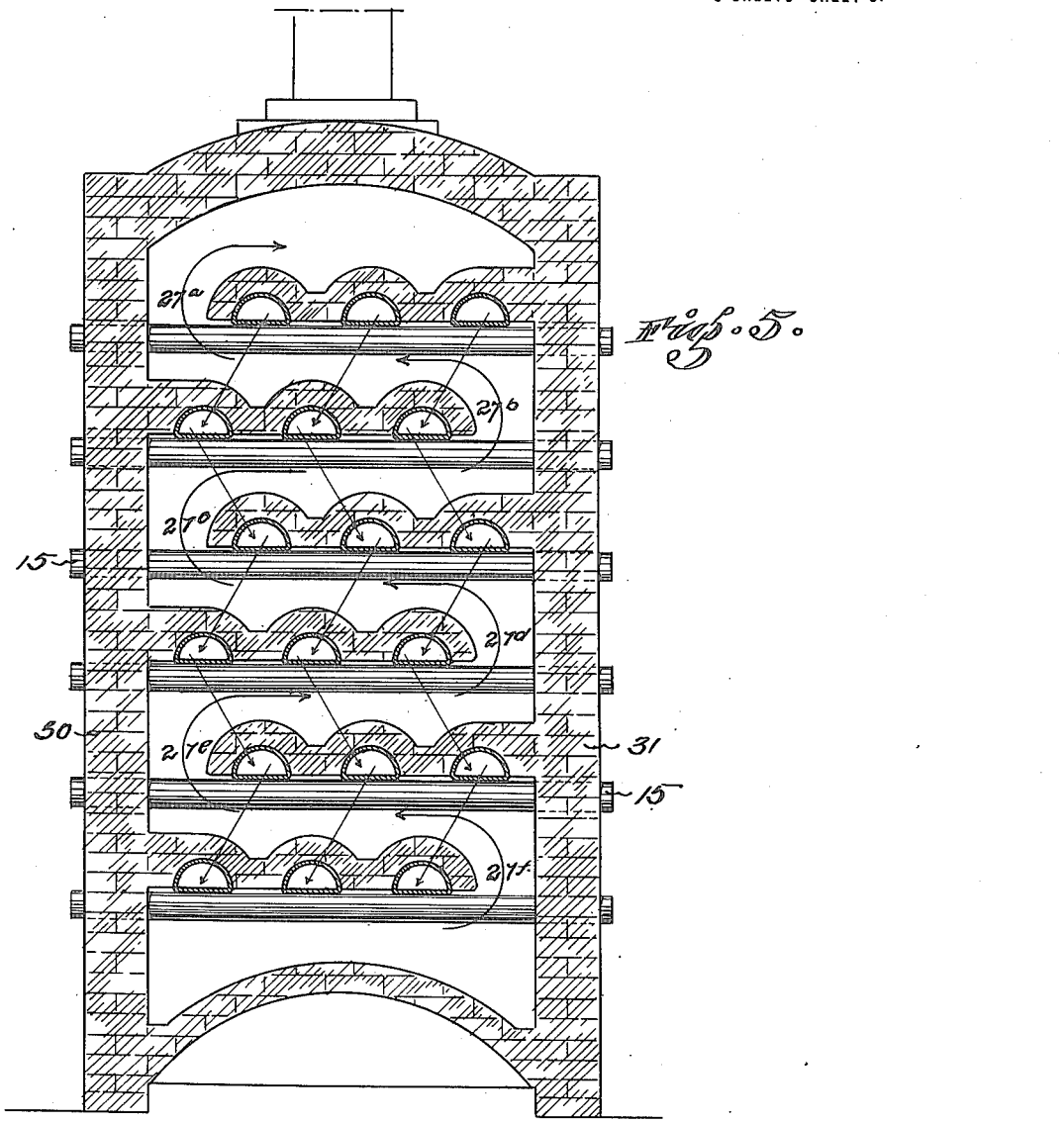

UNITED STATES PATENT OFFICE.

HARRY L. BURLESON, OF BELVEDERE, AND PAUL W. PRUTZMAN, OF BERKELEY, CALIFORNIA.

APPARATUS FOR THE DISTILLATION AND FRACTIONATION OF PETROLEUM AND OTHER LIQUIDS.

1,180,237.   Specification of Letters Patent.   Patented Apr. 18, 1916.

Application filed April 11, 1913. Serial No. 760,388.

*To all whom it may concern:*

Be it known that we, HARRY L. BURLESON and PAUL W. PRUTZMAN, both citizens of the United States, and residents, respectively, of Belvedere, in the county of Marin, State of California, and of Berkeley, in the county of Alameda, State of California, have invented certain new and useful Improvements in Apparatus for the Distillation and Fractionation of Petroleum and other Liquids, of which the following is a specification.

Among the objects of this invention are: to separate petroleum or other mixed liquids into any desired number of its fractional components at a single operation: to reduce, and under favorable conditions, to eliminate the decomposition of petroleum by the required heat for distillation; securing by fractionation by successive steps in a single operation products of better quality than heretofore produced by the processes in use. To reduce the cost of installation, operation and maintenance of the plant and simplify and improve the products and the process of fractioning natural or artificial liquid compositions.

This process of fractionation by distillation of any mixture of liquids or fusible and volatile solids is particularly advantageous on such mixtures as petroleum, coal tar, or gas tar, which contain elements decomposable by heat, but it is not limited to those designated substances.

The definition of distillation presupposes a means for subsequent condensation by cold, after the application of heat to force volatilization.

We wish to clearly differentiate our process of the fractionation of liquids from simple distillation and to the fractionation of the mass of vapors arising from a boiling liquid. In the latter instance to obtain the components given off at a high boiling point, the more volatile components are subjected to a heat far above their boiling points and are decomposed, broken down, lost and combined with the heavier components, to the detriment of the commercial value of the latter; whereas in our process and as the result of our novel form of apparatus, the several components are given off at their individual boiling points, retaining their desirable commercial characteristics of gravity, color, taste, smell or other standards, no by-products of decomposition or waste being carried over from one stage to the other in the continuous single operation of treating a flowing quantity of raw material.

The invention possesses other advantageous features which, with the foregoing, will be set forth at length in the following description, where we shall outline in full that form of invention selected for illustration in the drawings accompanying and forming part of the present specification.

The novelty of the invention will be included in the claims succeeding said description. From this, it will be apparent that we do not restrict ourselves to the showing made by said drawings and description, as we may adopt many variations within the scope of our invention as expressed in said claims.

In the drawings: Figure 1 is a diagrammatic side elevation partially in cross section on the line I—I (Fig. 2) illustrating the apparatus for fractionating liquids in accordance with the process of this invention. Fig. 2 is a front elevation of the same. Fig. 3 is a front elevation of the end coupling for the fractionation tubes in cross section on the line III—III (Fig. 1). Fig. 4 is a side elevation of the same in cross section on the line IV—IV (Fig. 3). Fig. 5 is an end sectional view of a modification of our invention showing the tubes laterally offset.

In detail the construction consists of the brick setting comprising the retort 1, having the arch top 2, and perforated arch wall 3, dividing off the furnace or combustion chamber 4, from the main body of the retort. The stack 5 is provided to carry off the waste products of combustion from the retort. Combustion in any suitable form is provided in the furnace; oil fuel is preferably used because of its easy regulation. This is supplied by the burner 6, projecting into the furnace and connected to a source of fuel supply. The specifications of the retort and the general setting will vary with the modifications of the apparatus or process to meet the requirements of particular conditions.

The fractionation means comprise the inclined tubes 7 joined at their ends by the return bends 8. So far as we are aware, the shape and peculiar arrangement of the tubes 7 are new in this art. The tubes are D shaped in cross section and set with the flat side down to form a flat inclined floor subjected to the action of the heat in the retort. The tubes are preferably composed of cast iron having the attaching flanges 9 cast thereon to provide means of attachment to the similar flanges 10 in the return bends 8. For the sake of economy, however, the tubes may be made of ordinary wrought iron pipe flattened into an oval or D shaped cross-section; the ends being left round to receive the standard threaded fittings, the threaded fittings being more economical than flanged unions. The specific details of construction are variable with conditions to be met or individual taste in putting this invention into practice.

The ends of the tubes 7 are set in the walls 11 and 12, through which they project for the attachment of the return bends 8. The inlet end of each tube is set higher than the outlet end, and the flat side forms the floor of the tube. The upper side of the tubes is preferably insulated from the heat of the retort by the shaped tiles 13 laid thereon the length of the tube exposed to the heat of the retort. In large plants wherein the tubes are long and liable to sag under heat they can be supported between the ends by one or more of the transverse supporting pipes 15 extending across the retort from side to side and extending through the sidewalls 16 and 17. Since the pipes 15 are subjected to the heat of the retorts, they may be coupled together and utilized as a preheater for the liquid to be fractionated, as a steam generator, or for other obvious utilities; or the tubes may be supported by transverse walls or arches of masonry to prevent the sagging thereof.

The perforated arch 3 may be of fire brick, grate bars, or the like, and is intended to confine the flame or fire to improve combustion and cause a more even distribution of heat throughout the retort; the waste products of combustion pass through the stack 5; changes in fuel call for consistent changes in the furnace arrangement.

The return bend fittings 8 consist of the flanged openings 18 and 19 coinciding with the ends of the tubes 7; the body of the fitting is divided by the partition 20 provided with an opening into which is fixed the pipe 21 which extends downward into the body of the trap 22 which is normally filled with the liquid being fractionated. The pipe 21 receives the liquid through the opening 18 and discharges it below the surface of the seal in the trap 22, whereby no vapor is permitted to pass from one tube or fractionation section to another because of the intervening traps past which no vapor or gas can pass. The liquid overflowing the trap 22 passes through the outlet 19 and into the succeeding tube or section.

The tubes are offset laterally as shown in Fig. 5, to present the flat bottoms of each tube more directly to the heat rising through the retort.

The angle of inclination of the tubes is variable with the gravity or flowing qualities of the liquid to be fractionated, the angle should be just sufficient to cause a thin film of liquid to flow gently and evenly down the floor of the tube, to allow ample time for volatile fractionation without dwelling long enough in the tube to decompose the divided out particles arising in the tube.

The process of fractionation and the operation of the apparatus in fractionating petroleum or crude oil will be described herein, although we do not wish to be understood as limiting the invention to that particular substance.

The crude oil is introduced through the control valve 23 into the topmost of the traps 22 and overflows into the upper or high end of the top tube 7$^a$, down which it gently flows, giving off by volatilization under the influence of the heat in the retort that component that separates at the lowest boiling point, in this instance naphtha, benzin, or the like. The vapors given off in the topmost tube 7$^a$ cannot escape at the ends of this tube because of the liquid traps there, but are led off through the pipe A wherein they condense by natural radiation, or they may be passed through a suitable mechanical condenser before passing to a suitable storage tank (not shown). To protect the upper portion of the tube containing the volatile vapors from the excessive heat, the tubes are insulated with the tiles 13, otherwise these vapors may be broken down or "burned" by the excessive heat, and their commercial value reduced. This is particularly true of the heavier components given off in the lower tubes where the heat is progressively greater and the boiling points of the remaining components higher. To insure the proper evacuation of each tube, it is preferably provided with the steam inlet 24, controlled by the valve 25, adapted to inject a jet of steam into the top of the tube to pick up the rising vapors and carry them downward and out at the top of the lower end of the tube. From the second trap the liquid after having given off its first component fraction overflows into tube 7$^b$, wherein the temperature is higher, representing the boiling point of the liquid at which the lighter distillates would be volatilized and fractionated or divided out by volatilization rising from the flowing mass of liquid, into the upper portion of the tube from which they are evacuated by the steam jet as described in connection with tube 7ª, the vapors passing off through the pipe B to a condenser or to a proper receptacle direct.

The process of fractionation of the component units from the flowing mass continues from tube to tube until the desired number of divisions have taken place, the heavier "distillate" passing off through the pipe C; the lighter gravity lubricating oil from the pipe D; the medium gravity oil from the pipe E; the heavier gravity oil from the pipe F; the residuum passing off through the pipe G. The process can be continued as long as the liquid will fractionate, the number of divisions depending upon the components of the liquid or the number of units in the apparatus, or the temperature of the fractionation tubes or units. In this manner the liquid is divided into as many fractions as there are tube units plus a non-volatile residue.

The temperature of the distillates and of the residue from any given unit is controlled by means of the fire and the feed, an increase of feed lowers the temperature of the tubes, while an increase of the fire raises it; whereby the fractionation can be stabilized and the fractional constants or standards maintained.

Among the prime advantages of this process and means of fractionation are, the high quality and sharply defined properties of each fractionated component or product. This is largely due to the fact that each particular fraction is not subjected to a heat greater than its boiling point: and owing to the traps sealing each end of each tube or battery of tubes controlling a given fraction, preventing the "carrying over" of one vapor from one unit to the next.

Economy in operation follows the direct fractionation in the use of this invention, because much of the purification and stabilizing of the products is eliminated, that is a consequence of the old method of distillation and fractionation of the vapor products thereof; less heat being required to treat a given quantity of raw material where such material is divided into thin flowing films, and the divided quantities progressively removed from further heat absorption, in contra-distinction to the old process of distillation wherein the whole mass is acted upon by the heat which is required to raise the boiling point of the mass to the maximum temperature necessary to the division of the component having the highest boiling point, making no mention of the deleterious effect of the excessive heat on the intermediate components. Other advantages will be sufficiently manifest to those skilled in this art.

Steam is chosen as the preferable evacuating medium because it has no chemical reaction with the volatile vapors, but other gases of suitable nature may be used. The use of steam, or the like, is not essential as the vapors will force their own way from the distillation tubes, and means may be provided for sucking or exhausting the vapors from the distillation units. The steam generator 26 set within the furnace and connected by the pipe 29 with a water supply is provided as a convenient means for generating the steam for carrying the vapors from the fractionation tubes.

Fig. 5 illustrates a modified way of passing the heat between alternate banks of fractionation tubes, a structure desirable in large plants to cause the heat to take a tortuous course through the retort causing a more uniform distribution of heat according to the various fractionation levels in the courses of tubes. The banks of tubes $27^a$, $27^b$, $27^c$, $27^d$, $27^e$, and $27^f$ start alternately from the side walls 30 and 31, causing the products of combustion to take the tortuous course indicated by the curved arrows.

What we claim and desire to secure by Letters Patent is:

1. An apparatus for fractionating masses, including a heating chamber; a series of tubes D shaped in cross section, superimposed in zig-zag formation in said chamber, with the flat portion of the tubes downward; vapor traps at the junctions of said tubes; vapor exits from said tubes; heat insulating covering applied to the upper side of said tubes; and means for flowing a film of the mass of uniform depth, along the bottoms of said tubes.

2. An apparatus for fractionating masses, including a heating chamber; a series of tubes D shaped in cross section, superimposed in zig-zag formation in said chamber, with the flat bottoms of the tubes downward; vapor exits from the lower ends of said tubes; vapor traps at the junctions of said tubes; inlets at the upper ends of said tubes for an expansive fluid; means for flowing a film of the mass of uniform depth, along the flat bottoms of said tubes; and means for heating the lower tubes to a relatively higher temperature than the upper tubes.

3. An apparatus for fractionating masses, including a heating chamber; a series of flat bottomed tubes superimposed in zig-zag formation in said chamber; vapor traps at the junctions of said tubes; vapor exits at the lower ends of said tubes; means for evacuating said tubes; means for flowing a film of the mass along the bottoms of said tubes; heat insulating covering applied to the upper side of said tubes; transverse tubular supports extending across said heating chamber beneath each series of tubes; and a heating means beneath said heating chamber.

4. An apparatus for fractionating masses, including a heating chamber; a series of flat bottomed tubes superimposed in zig-zag formation, both vertically and laterally in said chamber; vapor exits from each of said tubes; heat insulating covering applied to the upper portion of said tubes; means for flowing a film of the mass along the flat bottoms of said tubes; and a heating means beneath said chamber.

5. An apparatus for fractionating masses, including a heating chamber; a series of flat bottomed tubes superimposed in zig-zag formation both vertically and laterally in said chamber; heat insulating coverings applied to the upper portions of said tubes, and alternately joined to the opposite walls of said chamber and spaced from the opposite walls thereof, whereby the heat admitted at the bottom of said chamber will rise in a laterally tortuous passage therethrough.

6. An apparatus for fractionating masses, including a heating chamber; a series of flat bottomed tubes superimposed in zig-zag formation in said chamber; return bend fittings joining the converging ends of said tubes, and having a dividing partition therein, a trap in said fitting, and a pipe in said partition terminating below the top of said trap; means for flowing a film of the mass along the bottoms of said tubes, through said pipes and traps; a vapor exit at the bottom of each tube, and an inlet at the top of each tube to admit an evacuation fluid, substantially as described.

7. An apparatus for fractionating masses including a heating chamber, a series of tubes D-shaped in cross section, superimposed in zig-zag arrangement in said cham ber and having the flat portions thereof downward, liquid sealed vapor traps at the junction of said tubes, vapor exits from said tubes, means carried by each of said vapor traps above the said liquid seal for exhausting the vapor from said tubes, heat insulating covering applied to the upper sides of said tubes, and means for flowing a film of the said mass of uniform depth along the bottoms of said tubes.

8. An apparatus for fractionating masses, including a heating chamber; a series of tubes D shaped in cross section, superimposed in zig-zag formation in said chamber, with the flat portion of the tubes downward; vapor traps at the junctions of said tubes; vapor exits from said tubes; heat insulating covering applied to the upper side of said tubes, means for flowing a film of the mass of uniform depth along the bottoms of said tubes, and means for introducing gases of combustion into said chamber at one end thereof.

9. An apparatus for fractionating masses, including a heating chamber; a series of tubes D shaped in cross section, superimposed in zig-zag formation in said chamber, with the flat portion of the tubes downward; vapor traps at the junctions of said tubes; vapor exits from said tubes; heat insulating covering applied to the upper side of said tubes; means for flowing a film of the mass of uniform depth, along the bottoms of said tubes, and means for introducing steam into said tubes.

In testimony whereof, we have hereunto set our hands at San Francisco, California, this 29th day of March, 1913.

HARRY L. BURLESON.
PAUL W. PRUTZMAN.

In presence of—
BALDWIN VALE,
H. H. BEERS.